(12) United States Patent
Mansour et al.

(10) Patent No.: US 11,574,144 B2
(45) Date of Patent: Feb. 7, 2023

(54) PERFORMANCE OF A COMPUTER-IMPLEMENTED MODEL THAT ACTS AS A MULTI-CLASS CLASSIFIER

(71) Applicant: Microsoft Technology Licensing, LLC, Redmond, WA (US)

(72) Inventors: Riham Mansour, Redmond, WA (US); Carol Hanna, Cairo (EG); Youssef Shahin, Redmond, WA (US); Omar Essam Serour, Bellevue, WA (US); Ahmed Ashour, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 987 days.

(21) Appl. No.: 16/241,090

(22) Filed: Jan. 7, 2019

(65) Prior Publication Data

US 2020/0218939 A1     Jul. 9, 2020

(51) Int. Cl.
*G06F 16/35*     (2019.01)
*G06K 9/62*     (2022.01)

(52) U.S. Cl.
CPC ........... *G06K 9/6257* (2013.01); *G06F 16/35* (2019.01); *G06K 9/628* (2013.01); *G06K 9/6227* (2013.01); *G06K 9/6228* (2013.01)

(58) Field of Classification Search
CPC ..... G06F 16/35; G06K 9/6257; G06K 9/6227

USPC .......................................................... 706/12
See application file for complete search history.

(56) References Cited

U.S. PATENT DOCUMENTS

| | | | |
|---|---|---|---|
| 2011/0119210 A1* | 5/2011 | Zhang | G06N 20/00 706/12 |
| 2019/0102675 A1* | 4/2019 | Biswas | G06N 7/005 |
| 2019/0378009 A1* | 12/2019 | Nuzman | G06N 3/04 |
| 2020/0125639 A1* | 4/2020 | Doyle | G06F 40/30 |

* cited by examiner

*Primary Examiner* — Jeffery A Williams
(74) *Attorney, Agent, or Firm* — Alleman Hall Creasman & Tuttle LLP

(57) ABSTRACT

Technologies relating to improving performance of a computer-implemented model that acts as a multi-class classifier are described herein. A chatbot includes the computer-implemented model, and the computer-implemented model receives natural language input from end users. A subset of the natural language inputs are identified as training examples that are to be used to update the computer-implemented model, wherein the natural language inputs are identified as the training examples based upon comparisons between scores for the natural language inputs output by different classifiers of the computer-implemented model. The training examples are labeled by a developer, and the computer-implemented model is updated based upon the labeled training examples.

20 Claims, 7 Drawing Sheets

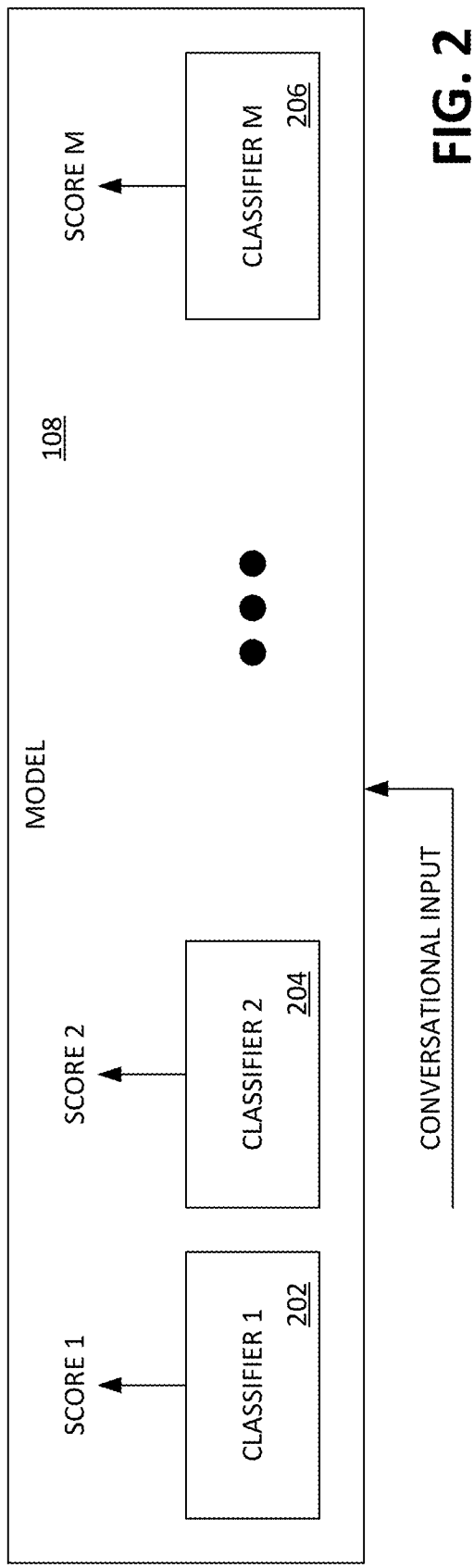
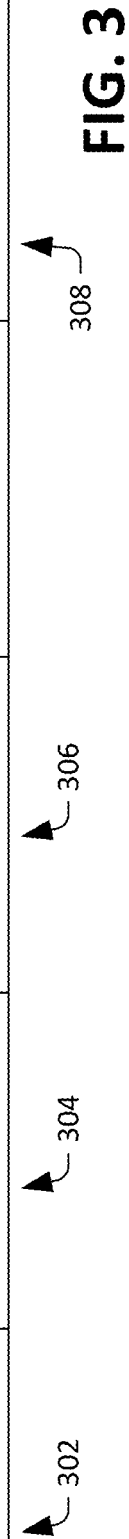
FIG. 2
FIG. 3

ApplyForJob

Job #567890

| here is my c. v. for position #654234 | LABEL ▷ |
| submit resume for engineering position | LABEL ▷ |
| fill out application for job #123456 | LABEL ▷ |
| i want to apply for the new account job | LABEL ▷ |

COMPLETE

FIG. 5

PERFORMANCE OF A COMPUTER-IMPLEMENTED MODEL THAT ACTS AS A MULTI-CLASS CLASSIFIER

BACKGROUND

A chatbot is a computer-implemented system that is configured to conduct a conversation with a human by way of auditory or textual methods. Chatbots are conventionally implemented in computing devices, speaker devices, video game consoles, websites, etc. For instance, a website can include a chatbot, wherein visitors to a web page of the website can interact with the chatbot, and further wherein the chatbot is configured to assist the visitors with functionalities offered by the website.

A chatbot may include a computer-implemented model that is configured to assign a label to conversational (natural language) input received from a user, wherein the label is identified from amongst several possible labels. For example, a website of an airline may have a chatbot incorporated therein, where the chatbot is configured to assist users who visit the airline website. The chatbot can include a computer-implemented model that is configured to assign one of a plurality of labels to each input received from a user, wherein the labels are indicative of an inferred intent of the user as represented by the input. In this example, labels can include "ticket purchase", "cancellation", "baggage", "flight status", etc. Thus, if the computer-implemented model receives the input "how much does it cost to check luggage", the computer implemented model may desirably assign the label "baggage" to such input.

Computer-implemented models included in chatbots are conventionally built through use of machine-learning systems. Specifically, in connection with building a computer-implemented model, labeled data is provided by a developer of the computer-implemented model to a machine-learning system, and the machine-learning system trains the computer-implemented model based upon the labeled training data. Thus, for instance, the developer generates and/or acquires numerous exemplary inputs that the developer foresees being provided to the computer-implemented model. The developer then assigns a respective label to each of these inputs, where the label is indicative of a desired output of the computer-implemented model when the computer-implemented model is provided with such input. The machine-learning system constructs the computer implemented model based upon the labeled inputs (where the computer-implemented model is a multi-class classifier).

Once the computer-implemented model has been built, the computer-implemented model can be tested and then updated (e.g., based upon additional training data). When the developer ascertains that the computer-implemented model performs acceptably, the computer-implemented model is deployed in the chatbot and end users begin interacting with the chatbot. Thus, the computer-implemented model receives conversational inputs from client devices of end users, and the computer-implemented model assigns a label to each of the received conversational inputs. Oftentimes, end users provide conversational inputs to the computer-implemented model that were not foreseen by the developer, and the computer-implemented model may not perform as well as hoped when deployed. Hence, the developer may wish to improve the computer-implemented model and subsequently redeploy the model.

Conventionally, there are two options that the developer may use to improve the computer-implemented model: 1) alter features of conversational inputs that are considered by the computer-implemented model when assigning labels thereto; or 2) update the computer-implemented model through use of additional training data. It is difficult, however, to identify training examples that will improve performance of the computer-implemented model. For instance, the computer-implemented model may perform sub-optimally when receiving conversational inputs that should be assigned the "baggage" label. The developer may attempt to update the computer-implemented model using 10 new training examples (either created from scratch by the developer or selected from logs of the chatbot). Such training examples, however, may not significantly improve performance of the computer-implemented model.

SUMMARY

The following is a brief summary of subject matter that is described in greater detail herein. This summary is not intended to be limiting as to the scope of the claims.

Described herein are various technologies pertaining to identifying, from amongst several end user conversation inputs to a computer-implemented model included in a chatbot, training examples that are to be provided to a developer of the computer-implemented model, wherein the training examples are identified as being particularly well-suited for improving performance of the computer-implemented model. The developer may then assign labels to the training examples, and the computer-implemented model can be updated based upon the labels assigned to the training examples. For instance, the computer-implemented model may be configured to assign one of M labels to each conversational input received by the computer-implemented model. In an exemplary embodiment, the computer-implemented model includes M classifiers, wherein each of the M classifiers is a binary classifier. In a more specific example, the computer-implemented model can be built for use in a chatbot that is incorporated into an airline website, where a first classifier in the M classifiers is configured to output scores that are indicative of whether conversational inputs are to be assigned a label "ticket purchase", a second classifier in the M classifiers is configured to output scores that are indicative of whether conversational inputs are to be assigned a label of "cancellation", a third classifier in the M classifiers is configured to output scores that are indicative of whether conversational inputs are to be assigned a label of "baggage", and so forth. Accordingly, when the computer-implemented model receives a conversational input, each of the M classifiers outputs a score for the conversational input, and the computer-implemented model assigns a label to the conversational input that corresponds to the classifier (from amongst the M classifiers) that output the highest score for the conversational input. Thus, when the computer-implemented model receives a conversational input, the M classifiers generate M scores for the input. The conversational input and the M scores assigned thereto by the M classifiers can be stored in computer-readable storage.

After the computer-implemented model has been deployed and end users have interacted with a chatbot that includes the computer-implemented model, a developer of the computer-implemented model may desire to improve performance of the computer-implemented model generally, and may desire to improve performance of a classifier in the M classifiers specifically. For instance, when reviewing logs of conversational inputs provided to the computer-implemented model and/or based upon feedback from the end users, the developer may ascertain that improvement of the classifier in the computer implemented model is desired.

To facilitate improvement of the computer-implemented model, a subset of the conversational inputs provided to the computer-implemented model by end users of the chatbot are identified as training examples that are to be provided to the developer of the computer-implemented model, wherein the subset of the conversational inputs are identified as being particularly well-suited for improving performance of the classifier (and thus performance of the computer-implemented model) when employed as training examples.

An exemplary process for identifying the subset of conversational inputs as being the training examples that are to be provided to the developer is as follows: 1) initially, data cleaning can be performed over log data of the chatbot to remove duplicate conversational inputs, to remove infrequently occurring conversational inputs, etc.; 2) a set of conversational inputs where scores output by the classifier are amongst the top two scores from amongst all scores output by the M classifiers are identified; 3) comparisons between the two highest scores for the conversational inputs in the set of conversation is performed; 4) the subset of conversational inputs that are to be provided as training examples to the developer are identified based upon the comparisons performed in 3). More specifically, a conversational input from the set of conversational inputs can be identified as a training example when the two highest scores for the conversational input are close to one another. A threshold number of conversational inputs from the set of conversational inputs can be selected, and such threshold number can be the subset of conversational inputs that are identified as training examples to be provided to the developer.

The training examples are transmitted to a client computing device operated by the developer, and the developer assigns correct labels to these training examples. The labeled training examples are then employed to update the classifier of interest to the developer (as well as other classifiers in the computer-implemented model). The computer-implemented model can then be redeployed in the chatbot, and the process of identifying training examples can be repeated over time to facilitate continuous improvement in performance of the chatbot.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a functional block diagram of an exemplary computer-implemented model.

FIG. 3 depicts scores assigned by classifiers of a computer-implemented model to inputs provided to the computer-implemented model.

FIG. 5 depicts a graphical user interface that is well-suited for use when assigning labels to training examples.

DETAILED DESCRIPTION

Figure 1:
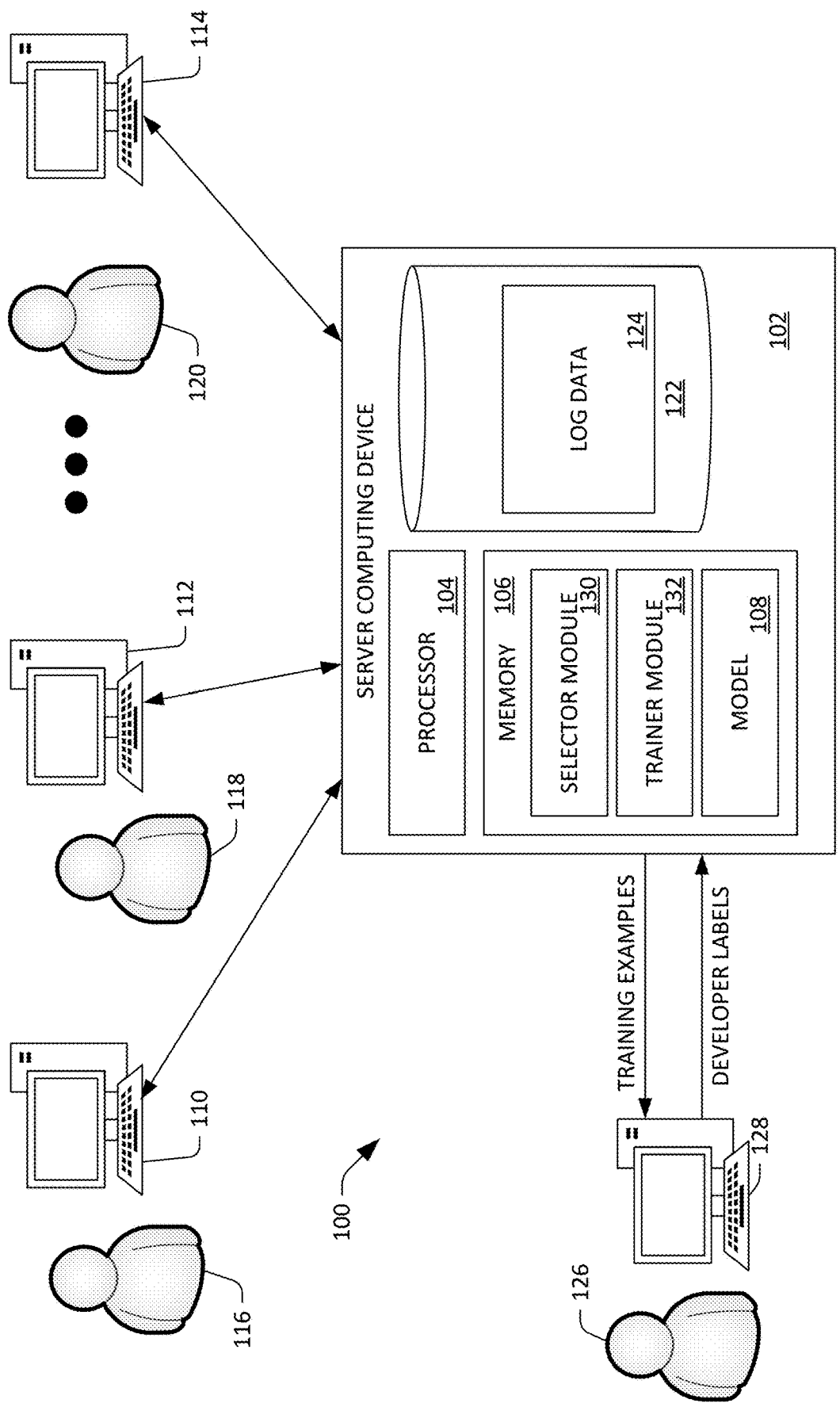
FIG. 1 is a functional block diagram of an exemplary system that facilitates identifying training examples to provide to a developer, wherein the training examples are well-suited for use in improving performance of a computer-implemented model that is configured to assign labels to conversational inputs.

Various technologies pertaining to identifying training examples that are particularly well-suited for use when improving performance of a multi-class classifier are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component, system, and/or module may be localized on a single device or distributed across several devices. Further, as used herein, the term "exemplary" is intended to mean serving as an illustration or example of something, and is not intended to indicate a preference.

As noted above, chatbots include computer-implemented models that act as multi-class classifiers, wherein such computer-implemented models are configured to receive conversational input and assign a label (from amongst several predefined labels) that is indicative of an intent of a user who set forth the conversational input. For instance, a computer-implemented model included in a chatbot on an airline website may be configured to label conversational input with one of the following labels: "purchase tickets", "baggage", "cancellation", "flight status", or "unknown". When deployed, the computer-implemented model may receive numerous (e.g., hundreds of thousands or even millions) of conversational inputs, and may assign a label to each received conversational input.

The technologies described herein relate to improving the computer-implemented model subsequent to the model being deployed. More specifically, various technologies pertaining to identifying training examples from end-user conversational inputs to a computer-implemented model are described herein, wherein the computer-implemented model is configured to assign one of a plurality of potential labels to each conversational input provided to the computer-implemented model, and further wherein the training examples are identified as being particularly well-suited for use in connection with updating the computer-implemented model to improve performance of such model (e.g., improve accuracy of the computer-implemented model). As noted previously, the computer-implemented model can be configured to assign multiple scores to each conversational input received by the computer-implemented model, wherein each score in the multiple scores corresponds to a respective label that may be assigned to the conversational input. As will be described in greater detail herein, training examples can be selected from numerous end-user conversational inputs based upon scores assigned to the potential labels for such inputs. More specifically, a conversational input can be identified as a training example based upon a comparison between different scores assigned to the conversational input by the computer implemented model.

With reference now to FIG. 1, an exemplary system 100 that facilitates improving performance of a computer-implemented model that is configured to assign a respective label from amongst a plurality of potential labels to conversational inputs set forth by end users. The system 100 comprises a server computing device 102, wherein the server computing device 102 includes a processor 104 and memory 106, and further wherein the memory 106 stores data that is accessible to the processor 104 and instructions that are executed by the processor 104. The memory 106 comprises a computer-implemented model 108 that is configured to receive conversational (e.g., natural language) input and assign a label from amongst M possible labels to the conversational input. Thus, the model 108 is configured to perform multi-class classification. Accordingly, the model 108 can be or include, for example, a deep neural network (DNN), a recurrent neural network (RNN), a Bayesian Network, several binary classifiers, etc.

For purposes of explanation (and not limitation), the model 108 is described herein as including M binary classifiers, wherein, for example, a first classifier in the M classifiers is configured to output a first score in response to receipt of conversational input, a second classifier in the M classifiers is configured to output a second score in response to receipt of the conversational input, and so forth. The first score output by the first classifier is indicative of whether or not a first label is to be assigned to the conversational input, the second score output by the second classifier is indicative of whether or not a second label is to be assigned to the conversational input, and so forth. For instance, the first score output by the first classifier may be indicative of whether the conversational input is to be assigned the label "purchase tickets", while the second score output by the second classifier may be indicative of whether the conversational input is to be assigned the label "baggage". The computer-implemented model 108 identifies the classifier from amongst the M classifiers that output the highest score for the conversational input, and assigns a label that corresponds to the classifier to the received conversational input based upon the classifier outputting the highest score for the conversational input.

Several clients computing devices 110-114 are in network communication with the server computing device 102, wherein the client computing devices 110-114 are operated by end users 116-120, respectively. The client computing devices 110-114 may be any suitable type of client computing device that can be placed in network communication with the server computing device 102 and can be employed to provide conversational input to the computer-implemented model 108. Thus, the client computing devices 110-114 can include, but are not limited to including, desktop computing devices, laptop computing devices, tablet computing devices, wearable computing devices (e.g., headgear, watches, etc.), smart speakers, mobile telephones, and so forth. The end users 116-120 can set forth conversational inputs to the client computing devices 110-114, wherein the conversational inputs are to be provided to the computer-implemented model 108. The model 108, for each received conversational input, outputs M scores. The server computing device 102 additionally includes a data store 122, wherein the data store 122 comprises log data 124. The log data 124 includes the conversational inputs provided to the model 108 by way of the client computing devices 110-114 as well as the M scores assigned by the model 108 to each of the conversational inputs.

At some point in time after the model 108 has been deployed and the end users 116-120 have interacted with the chatbot (and thus the model 108), a developer 126 of the model 108 may wish to improve performance of the model 108. The developer 126 operates a client computing device 128, wherein the client computing device 128 can transmit a request for training examples to the server computing device 102, and further wherein the training examples are to be presented to the developer 122 for labeling and subsequently used for updating the model 108. To that end, the memory 106 comprises a selector module 130 that is configured to identify a subset of the conversational inputs in the log data 124 as training examples, wherein the identified training examples are particularly well-suited for improving performance of the model 108. With more specificity, the selector module 130 can identify N conversational inputs from P conversational inputs in the log data 124 as training examples, where P>N. The selector module 130 can identify the N conversational inputs as training examples based upon scores assigned to the N conversational inputs by a classifier in the model 108 relative to scores assigned to the N conversational inputs by other classifiers in the model 108. With still more particularity, the log data 124 can reflect that a first classifier in the model 108 assigned a first score to a conversational input received by the model 108. The log data 124 can further reflect that a second classifier in the model 108 assigned a second score to the conversational input. The selector module 130 can identify the conversational input as being a training example based upon a difference between the first score and the second score.

This approach for identifying training examples from the log data 124 is in contrast to the conventional approach for identifying training examples from log data. In the conventional approach, a classifier is trained towards its boundary and training examples are selected based solely upon scores output by the classifier, without regard for scores output by other classifiers.

Responsive to the selector module 130 identifying the N conversational inputs (from P conversational inputs in the log data 124) as being N training examples, the selector module 130 transmits the N training examples to the client computing device 128 operated by the developer 126. The developer 126, through interaction with the client computing device 128, assigns N labels to the N training examples, wherein the labels are indicative of the correct labels that are to be assigned to the training examples by the model 108 when the model 108 is provided with such training examples. The client computing device 128, in response to input from the developer 126, causes the training examples and corresponding labels to be transmitted to the server computing device 102. The memory 106 of the server computing device 102 additionally includes a trainer module 132 that receives the labeled training examples from the client computing device 128 and updates the model 108 based upon the labeled training examples (utilizing any suitable technique). As noted previously, the model 108 may include M classifiers. In an exemplary embodiment, the trainer module 132 can employ a one versus all learning approach, such that each of the M classifiers is updated based upon the received labeled training examples.

The approach described above exhibits various advantages over conventional approaches for updating a model that is configured to assign labels to conversational input. Because the selector module 130 is configured to identify a conversational input as a training example where the model 108 was potentially confused when assigning a label to the conversational input (e.g., when scores output by different classifiers for the conversational input were relatively close to one another), use of such conversational input as a training example ensures improved performance of the model 108. In addition, the computer-implemented model 108 is updated based upon end user interaction with the model 108, and thus the model 108 is updated to reflect observed end user behavior. Moreover, the developer 126 can be provided with a relatively small number (e.g., 10-20) training examples to label, wherein use of such labeled training examples results in improvement of performance of the model 108.

Referring now to FIG. 2, a functional block diagram of the computer-implemented model 108 is illustrated. As indicated previously, in an exemplary embodiment, the model 108 can include M classifiers 202-206. Each of the classifiers 202-206 can be configured to output a score for each input received by the model 108. Further, a score output by the first classifier 202 is indicative of whether a first label (e.g., "flight purchase") is to be assigned to the conversational input, a score output by the second classifier 204 is indicative of whether a second label (e.g., "baggage") is to be assigned to the conversational input, and a score output by Mth classifier is indicative of whether an Mth label (e.g., "unknown") is to be assigned to the conversational input. When the first score is the highest score from amongst all scores output by the M classifiers 202-206, the model 108 assigns the first label to the conversational input; when the second score is the highest score from amongst all scores output by the M classifiers 202-206, the model assigns the second label to the conversational input, and so forth.

FIG. 3 depicts a table 300 that illustrates exemplary content of the log data 124 when the model 108 includes the M classifiers 202 through 206. The table 300 includes a first column 302 that identifies conversational inputs provided to the model 108 by end users. The table 300 further includes a second column 304 that comprises scores output by the first classifier 202 for the conversational inputs in the first column 302. The table 300 additionally includes a third column 306 that includes scores output by the second classifier 204 for the conversational inputs in the first column 302. The table 300 also includes an M+1th column 308 that comprises scores output by the Mth classifier 206 for the conversational inputs in the first column 302. As will be described below, the selector module 304 compares scores in the log data 124 and identifies conversational inputs for presentment to the developer 126 based upon such comparison.

Figure 4:
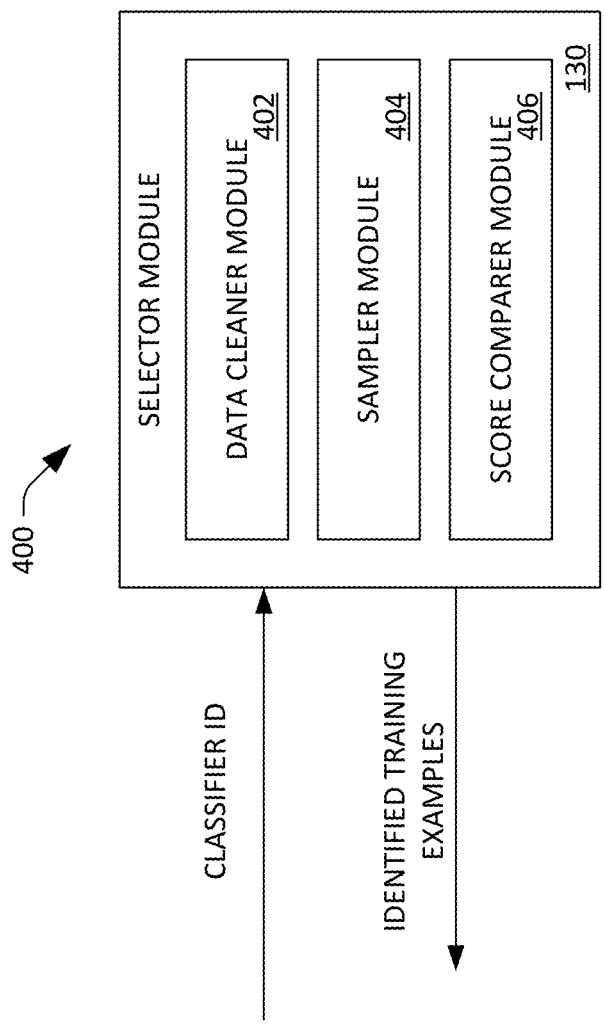
FIG. 4 is a functional block diagram of an exemplary selector module that is configured to select training examples from a plurality of conversational inputs that have been provided to a computer-implemented model by end users.

Referring now to FIG. 4, a functional block diagram of the selector module 130 is illustrated. The selector module 130 includes a data cleaner module 402 that is configured to clean the log data 124 prior to conversational inputs in the log data being identified as training examples, thereby creating a subset of the log data 124. The selector module 130 may optionally comprise a sampler module 404 that samples entries from the subset of the log data subsequent to the data cleaner module 402 cleaning the log data 124. The selector module 130 also includes a score comparer module 406 that is configured to compare scores output by different classifiers for sampled conversational inputs. The selector module 130 identifies N conversational inputs as being training examples, wherein the N conversational inputs are identified based upon comparisons performed by the score comparer module 406.

Additional detail pertaining to operation of the selector module 130 is now set forth. The data cleaner module 402 can utilize various approaches to "clean" the log data 124. For example, the data cleaner module 402 can be configured to identify and remove duplicate conversational inputs (and corresponding scores) from the log data 124. In another example, the data cleaner module 402 can be configured to identify and remove conversational inputs that appear a relatively small number of times in the log data 124. As noted above, the data cleaner module 402 receives the log data 124 as input and outputs a subset of the log data.

Optionally, the sampler module 404 receives the subset of the log data and samples conversational inputs and corresponding scores from the subset of the log data using any suitable sampling algorithm.

The score compare module 406 is configured to perform comparisons to identify N conversational inputs from sampled conversational inputs that are to be provided to the developer 126 as training examples, wherein the developer uses the N training examples to update the model 108. For example, the score comparer module 406 can receive an identifier of a classifier from amongst the classifiers 202-206 from the client computing device 128 operated by the developer 126. For purposes of explanation, the score comparer module 406 can receive an indication that the developer desires to update the first classifier 202 through use of additional training examples. With respect to a sampled conversational input, the score comparer module 406 can compare scores output by the classifiers 202-206 for the sampled conversational input, and can ascertain whether the score output by the first classifier 202 (the classifier of interest) was amongst a highest two scores output by the M classifiers 202-206 (e.g., whether the score output by the first classifier 202 was either a highest score or a second highest score).

When the score output by the first classifier 202 is amongst the highest two scores output by the M classifiers, the score compare module 406 determines an absolute value of a difference between the highest two scores output by the M classifiers. In an example, when the absolute value of the difference between the two highest scores is beneath a predefined threshold, the selector module 130 can identify the sampled conversational input as being a training example for provision to the developer 126. The selector module 130 can repeat the process described above until N conversational inputs are identified.

In another exemplary embodiment, alternatively to or in addition to identifying the sampled conversational input as a training example when the absolute value of the difference between the highest two scores output by the M classifiers is beneath a predefined threshold, the selector module 130 can create a ranked list of conversational inputs, and can identify the N most highly ranked conversational inputs in the ranked list as training examples. In such an embodiment, the ranked list includes conversational inputs where scores output by the first classifier 202 for such inputs were amongst the highest two scores for the inputs, where the conversational inputs are ranked based upon the absolute values of the differences between the two highest scores (with a smaller difference corresponding to a higher position in the ranked list).

In a specific example, for the conversational input "can I pay for luggage when I book my flight", the first classifier 202 may output a score of 0.6 for the label "purchase tickets", the second classifier 204 may output a score of 0.62 for "baggage", and the Mth classifier may output a score of 0.4 for "unknown". The score comparer module 406 can compare the scores and ascertain that the score output by the first classifier 202 (0.6) was amongst the two highest scores (e.g., the second highest score). The score comparer module 406 then determines an absolute value of the difference between the two highest scores (e.g., 0.02). The score comparer module 406 may then compare the difference with a threshold (e.g., 0.05), and determine that the difference is beneath the threshold. Accordingly, in an exemplary embodiment, the selector module 130 can identify the conversational input "can I pay for luggage when I book my flight" as a training example that is to be provided to the developer 126.

Responsive to identifying N conversational inputs as N training examples, the selector module 130 transmits the identified training examples to the client computing device 128 operated by the developer 126 for labeling.

Now referring to FIG. 5, an exemplary graphical user interface (GUI) 500 that can be presented on a display of the client computing device 128 is illustrated. The GUI 500 is configured to present training examples on the display and provide interface elements that are configured to receive labels from the developer 126 for the training examples. In the exemplary GUI 500, four separate training examples are depicted. Drop-down menus are horizontally displaced from the training examples, wherein the developer 126 can interact with the drop-down menus to assign labels to the training examples. For instance, upon the developer 126 interacting with a drop-down menu, numerous selectable labels that are assignable to a training example are presented. Responsive to the developer 126 assigning labels to the training examples, the developer 126 can indicate (by way of a button) that labeling is completed, and the client computing device 128 can transmit the labeled training examples to the server computing device 102, whereupon the trainer module 132 updates the model 108 based upon the labeled training examples. Once updated, the model 108 is redeployed for use.

Figure 6:
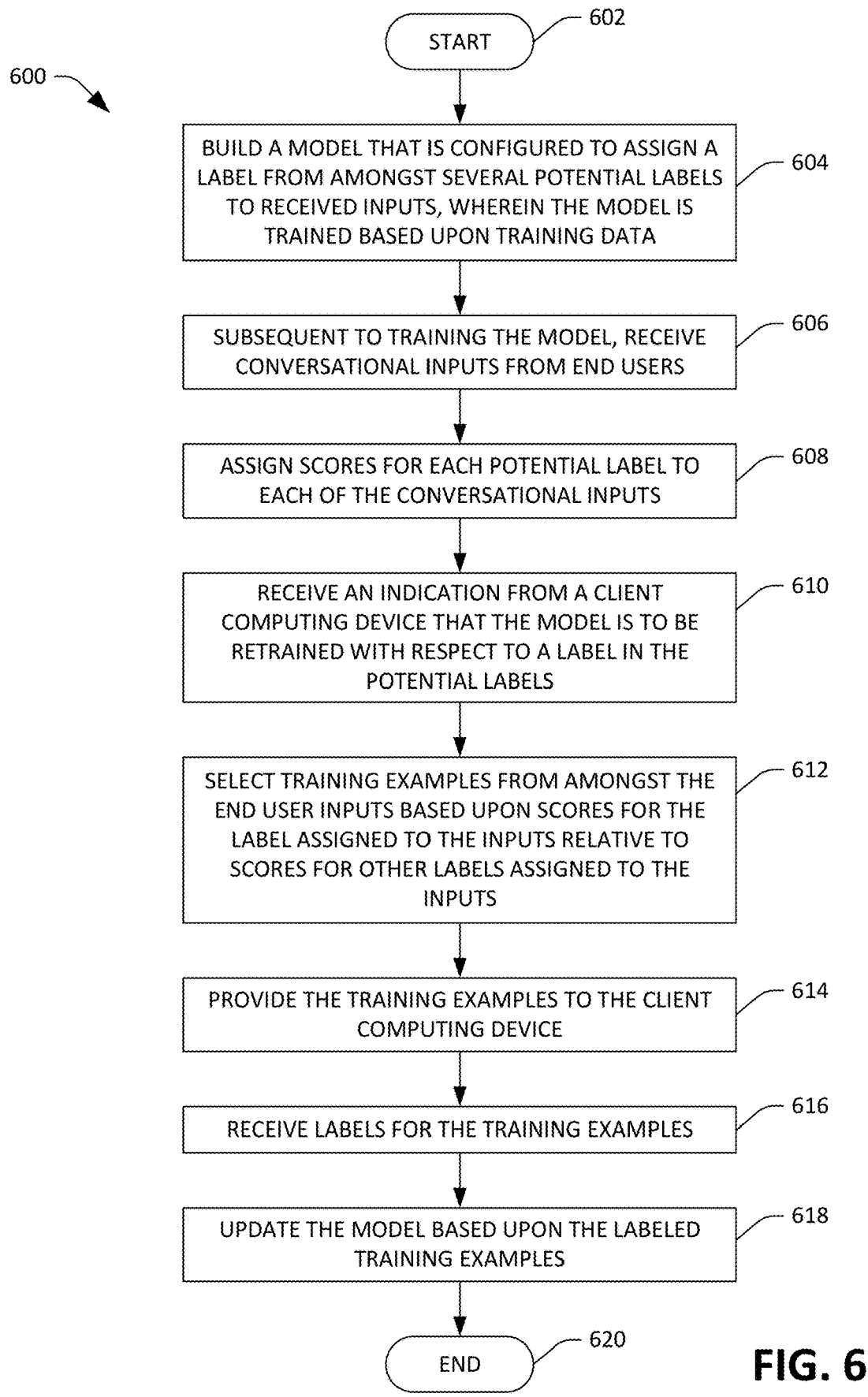
FIG. 6 is a flow diagram that illustrates an exemplary methodology for updating a computer-implemented model based upon labeled training examples.
Figure 7:
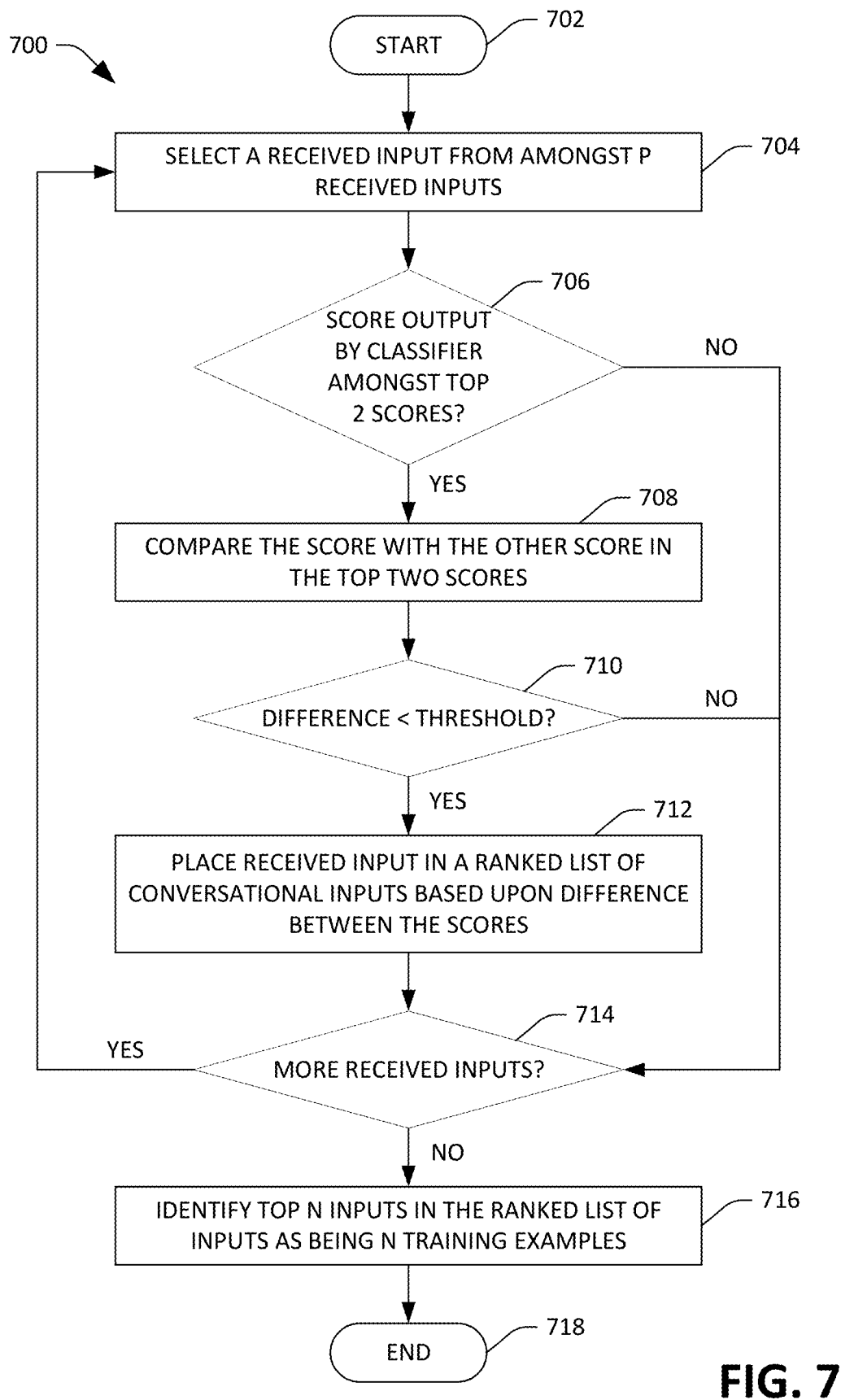
FIG. 7 is a flow diagram illustrating an exemplary methodology for identifying training examples to provide to a developer of a computer-implemented model.

FIGS. 6-7 illustrate exemplary methodologies relating to improving performance of computer-implemented models that are configured to assign labels to conversational inputs. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference solely to FIG. 6, a flow diagram illustrating an exemplary methodology 600 for updating a computer-implemented model based upon labeled training examples is illustrated, wherein the computer-implemented model is a multi-class classifier that is incorporated into a chatbot. The methodology 600 starts at 602, and at 604 a model is built based upon training data provided by a developer of the model, wherein the built model is configured to assign a label from amongst several potential labels to each received input from end users. The model is incorporated into a chatbot, and accordingly the training data and the inputs are conversational (natural language) inputs. These conversational inputs can be set forth by end users by way of keyboards, voice recognition technology, eye tracking technology, etc.

At 606, the model is deployed, and conversational inputs are received at the model from client computing devices operated by end users. The model assigns scores for each potential label to each of the received conversational inputs. As described previously, the model 108 may include M binary classifiers, wherein each of the M classifiers corresponds to a respective label, and further wherein each of the M classifiers outputs a respective score for a respective label to each received conversational input.

At 610, an indication from a client computing device operated by the developer that the model is to be retrained with respect to a label in the potential labels is received. For instance, the developer may indicate that the classifier is to be updated that is configured to output scores that are indicative of whether the label "baggage" is to be assigned to conversational input. At 612, N conversational inputs from amongst the conversational inputs are identified as training examples based upon scores for the label assigned to the conversational inputs relative to scores for other labels assigned to the conversational inputs. Thus, the training examples are selected based upon comparisons between scores output by different classifiers.

At 614, the training examples are provided to the client computing device operated by the developer, whereupon the developer can indicate the appropriate label that is to be assigned to the training examples. At 616, labels for the training examples, as set forth by the developer, are received. At 618, the model is updated (using any suitable machine learning technologies) based upon the labeled training examples. The methodology 600 completed 620.

Now referring to FIG. 7, a flow diagram illustrating an exemplary methodology 700 for selecting training examples from numerous end-user inputs is illustrated. The methodology 700 starts at 702, and at 704 a received end user input from amongst P received end-user inputs is selected from log data of a computer-implemented model that has been incorporated into a chatbot. The model includes M classifiers, and a classifier from amongst the M classifiers has been identified by a developer as being of interest for improvement.

At 706, a determination is made regarding whether the score output by the classifier of interest for the received end user input is amongst the top two scores from amongst all scores output by the M classifiers for the received end user input.

When it is determined at 706 that the score output by the classifier of interest is amongst the top two scores, then at 708 the score is compared with the other score in the top two scores. For instance, if the classifier of interest output a first score that was a highest score for the received input and another classifier output a second highest score for the received input, then at 708 the first score is compared with the second score to determine a difference between the two scores. At 710, a determination is made regarding whether the difference between the two scores is less than a predefined threshold.

When it is determined at 710 that the difference is less than the predefined threshold, then at 712 the end user input selected at 704 is placed in a ranked list of end user inputs, where a position of the end user input in the ranked list is based upon an absolute value of the difference between the two scores (the lower the difference, the higher in the ranked list). When it is determined at 706 that the score output by the classifier of interest is not amongst the top two scores, or when it is determined at 708 that the difference is not less than the predefined threshold, or responsive to placing the input in the ranked list of inputs at 712, the methodology proceeds to 714, where a determination is made as to whether there are additional end user inputs to analyze. When it is determined at 714 that there are more inputs to analyze, the methodology returns to 704. When it is determined that there are no more inputs to analyze, then at 716 the top N inputs in the ranked list of inputs are identified as N training examples to provide to a developer for labeling. The methodology 700 completes at 718.

Figure 8:
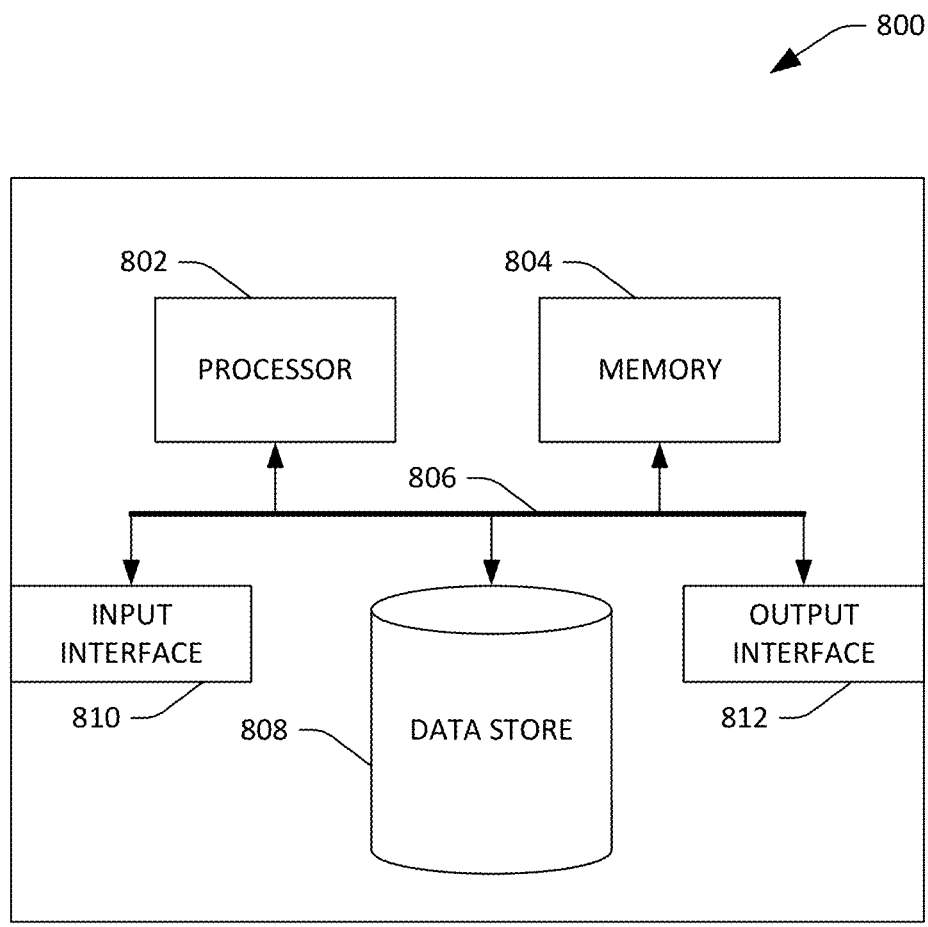
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that is configured to improve performance of a multi-class classifier. More specifically, the computing device 800 can be used in a system that is configured to identify training examples from end-user inputs, wherein the identified training examples are particularly well-suited for improving the multi-class classifier. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to improve performance of a computer-implemented model, the computing system comprising:
   a processor; and
   memory storing instructions that, when executed by the processor, cause the processor to perform acts comprising:
      in response to receiving a request from a client computing device for N training examples for a classifier in the computer-implemented model, identifying N inputs from amongst P inputs previously provided to the computer-implemented model as the N training examples, where P>N, and further wherein the N inputs are identified as the N training examples based upon a similarity between scores assigned to the N inputs by the classifier relative to scores assigned to the N inputs by at least one other classifier in the computer-implemented model;
      responsive to identifying the N inputs as the N training examples, transmitting the N training examples to the client computing device;
      subsequent to transmitting the N training examples to the client computing device operated by a developer of the computer-implemented model, receiving, from the client computing device, labels that the developer has assigned to the N training examples, wherein the labels are indicative of a desired output of the classifier when provided with the N training examples; and
      responsive to receiving the labels from the client computing device, updating the classifier based upon the labels assigned to the N training examples.

2. The computing system of claim 1, wherein the classifier is a binary classifier.

3. The computing system of claim 1, the acts further comprising:
   updating the at least one other classifier based upon the labels assigned to the N training examples.

4. The computing system of claim 1, wherein the computer-implemented model comprises a plurality of classifiers that include the classifier and the at least one other classifier, wherein each classifier in the plurality of classifiers outputs a score for each input provided to the computer-implemented model, and further wherein the N inputs are identified as the N training examples based upon comparisons between scores output by the plurality of classifiers in response to the computer-implemented model receiving inputs.

5. The computing system of claim 4, wherein identifying the N inputs as the N training examples comprises:
   determining a difference between a first score output by the classifier and a second score output by a second classifier in the computer-implemented model, wherein the classifier outputs the first score based upon an input in the N inputs, and further wherein the second classifier outputs the second score based upon the input in the N inputs;
   comparing the difference between the first score and the second score with a threshold; and
   identifying the input as being one of the N training examples based upon the difference between the first score and the second score being beneath the threshold.

6. The computing system of claim 5, wherein identifying the N inputs as the N training examples further comprises:
   determining that the first score is one of the highest two scores from amongst scores output by the plurality of classifiers for the input; and
   determining that the second score is the other of the highest two scores from amongst the scores output by the classifiers for the input, wherein the input is identified as being one of the N training examples based upon the first score and the second score being the highest two scores from amongst the scores output by the classifiers for the input.

7. The computing system of claim 6, wherein the first score is a highest score from amongst the scores, and further wherein the second score is a second highest score from amongst the scores.

8. The computing system of claim 6, wherein the first score is a second highest score from amongst the scores, and further wherein the second score is a highest score from amongst the scores.

9. The computing system of claim 6, wherein for each input in the N inputs, a respective score output by the classifier for a respective input is one of the two highest scores from amongst scores output by the classifiers for the respective input.

10. The computing system of claim 4, wherein each classifier in the plurality of classifiers is a binary classifier.

11. A computer-implemented method that facilitates improving performance of a computer-implemented model that comprises a plurality of classifiers, the method performed by at least one server computing device, the method comprising:
   identifying N inputs to the computer-implemented model from amongst P inputs to the computer-implemented model as N training examples to provide to a developer of the computer-implemented model, wherein P>N, and further wherein the N inputs are identified as the N training examples based upon a similarity between first scores output for the N inputs by a classifier in the computer-implemented model relative to second scores output for the N inputs by at least one other classifier in the plurality of classifiers;
   subsequent to identifying the N inputs as the N training examples, transmitting the N training examples to a client computing device of the developer of the computer-implemented model;
   subsequent to transmitting the N training examples to the client computing device, receiving, from the client computing device, N labels assigned by the developer to the N training examples, wherein the N labels identify correct outputs of the classifier when the classifier receives the N training examples; and responsive to receiving the N labels, updating the classifier based upon the N labels.

12. The computer-implemented method of claim 11, further comprising updating each classifier in the plurality of classifiers based upon the N labels.

13. The computer-implemented method of claim 12, wherein each classifier in the plurality of classifiers is a binary classifier.

14. The computer-implemented method of claim 11, wherein identifying the N inputs to the computer-implemented model as the N training examples comprises:
for each input in the N inputs, determining that a score output by the classifier for the input is amongst a highest two scores from amongst scores output by the plurality of classifiers for the input, wherein the input is identified as one of the N training examples based upon the score being amongst the highest two scores.

15. The computer-implemented method of claim 14, wherein identifying the N inputs to the computer-implemented model as the N training examples further comprises:
for each input in the N inputs, determining that a difference between the score and the other score from amongst the highest two scores is beneath a threshold, wherein the other score is output by another classifier in the plurality of classifiers, and further wherein the input is identified as one of the N training examples based upon the difference being beneath the threshold.

16. The computer-implemented method of claim 11, wherein the P inputs are natural language inputs provided to a chatbot, wherein the chatbot performs actions based upon outputs of the computer-implemented model.

17. The computer-implemented method of claim 11, wherein the computer-implemented model comprises four classifiers.

18. A server computing device in network communication with a client computing device operated by a developer of a computer-implemented model that is configured to assign labels to natural language inputs based upon outputs of classifiers of the computer-implemented model, the server computing device comprising:
a processor; and
memory storing instructions that, when executed by the processor, cause the processor to perform acts comprising:
for a natural language input previously provided to the computer-implemented model, determining a difference between a first score and a second score, wherein the first score is output by a first classifier for the natural language input, wherein the second score is output by a second classifier for the natural language input, and further wherein the computer-implemented model includes the first classifier and the second classifier;
responsive to determining the difference between the first score and the second score, determining that the difference between the first score and the second score is beneath a predefined threshold;
labeling the natural language input as a training example to be provided to the developer based upon the difference between the first score and the second score being beneath the predefined threshold;
subsequent to labelling the natural language input as the training example, transmitting the natural language input to the client computing device as the training example;
subsequent to transmitting the natural language input to the client computing device as the training example, receiving a label assigned to the natural language input by the developer, the label identifies a correct output of the first classifier when the first classifier is provided with the natural language input; and
updating the first classifier based upon the label assigned to the natural language input by the developer.

19. The server computing device of claim 18, further comprising updating the second classifier based upon the label assigned to the natural language input by the developer.

20. The server computing device of claim 18, wherein the first classifier and the second classifier are binary classifiers.

\* \* \* \* \*